(12) United States Patent
Reynolds et al.

(10) Patent No.: US 8,072,892 B2
(45) Date of Patent: Dec. 6, 2011

(54) GENERATING TEST SETS

(75) Inventors: Richard John Buchan Reynolds, Salzburg (AT); Simon Richard Broom, Ipswich (GB); Paul Alexander Barrett, Ipswich (GB)

(73) Assignee: Psytechnics Limited, Ipswich (GB)

( * ) Notice: Subject to any disclaimer, the term of this patent is extended or adjusted under 35 U.S.C. 154(b) by 527 days.

(21) Appl. No.: 11/509,348

(22) Filed: Aug. 24, 2006

(65) Prior Publication Data
US 2007/0047460 A1    Mar. 1, 2007

(30) Foreign Application Priority Data
Aug. 25, 2005    (EP) .................................... 05255232

(51) Int. Cl.
G01R 31/08    (2006.01)
(52) U.S. Cl. ...................................... 370/252; 370/352
(58) Field of Classification Search .................. 370/242, 370/243, 244, 245, 248, 250, 252, 352
See application file for complete search history.

(56) References Cited

U.S. PATENT DOCUMENTS

| | | | |
|---|---|---|---|
| 6,862,291 B2* | 3/2005 | Talpade et al. | 370/412 |
| 6,965,597 B1* | 11/2005 | Conway | 370/389 |
| 7,099,282 B1* | 8/2006 | Hardy | 370/252 |
| 7,245,584 B2* | 7/2007 | Goringe et al. | 370/232 |
| 7,359,332 B2* | 4/2008 | Kolze et al. | 370/252 |
| 2002/0193999 A1* | 12/2002 | Keane et al. | 704/270 |
| 2004/0193974 A1 | 9/2004 | Quan et al. | |
| 2007/0011006 A1* | 1/2007 | Kim | 704/233 |

OTHER PUBLICATIONS

Rix, Anthony, Perceptual Speech Quality Assessment—A Review, IEEE, Sep. 4, 2004, United Kingdom.
European Search Report, for European Patent Application EP 05 25 5232, on Feb. 24, 2006.
Rix A W: "Perceptual speech quality assessment—a review" Acoustics, Speech, and Signal Processing, 2004. Proceedings. (ICASSP'04). IEEE International Conference on Montreal, Quebec, Canada May 17-21, 2004, Piscataway, NJ USA, IEEE, vol. 3, May 17, 2004, pp. 1056-1059, XP010718375, ISBN: 0-7803-8484-9 abstract p. 1058, right-hand column, line 44-line 52.

* cited by examiner

*Primary Examiner* — Ricky Ngo
*Assistant Examiner* — Christine Ng
(74) *Attorney, Agent, or Firm* — Fenwick & West LLP

(57) ABSTRACT

This invention relates to a method of defining an optimised set of test sequences for use with a packet based perceptual quality evaluation processor associated with an edge-device that receives packets containing speech data and converts said packets to a speech signal, the method comprising the steps of: defining a set of quality targets which should be produced when a test sequence of packets is processed by the edge-device; determining a value for a degradation parameter for each quality target wherein a test sequence having a degradation according to said value will substantially produce said quality target when said test sequence is processed by the edge-device.

16 Claims, 9 Drawing Sheets

GENERATING TEST SETS

BACKGROUND

1. Field of the Invention

This invention relates to a non-intrusive speech quality assessment system.

Signals carried over telecommunications links can undergo considerable transformations, such as digitization, encryption and modulation. They can also be distorted due to the effects of lossy compression and transmission errors.

Objective processes for the purpose of measuring the quality of a signal are currently under development and are of application in equipment development, equipment testing, and evaluation of system performance.

Some automated systems require a known (reference) signal to be played through a distorting system (the communications network or other system under test) to derive a degraded signal, which is compared with an undistorted version of the reference signal. Such systems are known as "intrusive" quality assessment systems, because whilst the test is carried out the channel under test cannot, in general, carry live traffic.

Conversely, non-intrusive quality assessment systems are systems which can be used whilst live traffic is carried by the channel, without the need for test calls.

Non-intrusive testing is required because for some testing it is not possible to make test calls. This could be because the call termination points are geographically diverse or unknown. It could also be that the cost of capacity is particularly high on the route under test. A non-intrusive monitoring application can run all the time on the live calls to give a meaningful measurement of performance.

A known non-intrusive quality assessment system uses a database of distorted samples which has been assessed by panels of human listeners to provide a Mean Opinion Score (MOS).

MOSs are generated by subjective tests which aim to find the average user's perception of a system's speech quality by asking a panel of listeners a directed question and providing a limited response choice. For example, to determine listening quality users are asked to rate "the quality of the speech" on a five-point scale from Bad to Excellent. The MOS, is calculated for a particular condition by averaging the ratings of all listeners.

In order to train the quality assessment system each sample is parameterized and a combination of the parameters is determined which provides the best prediction of the MOSs indicted by the human listeners. International Patent Application number WO 01/35393 describes one method for parameterizing speech samples for use in a non-intrusive quality assessment system.

There are particular issues to be considered when assessing speech quality over a packet switched network, in particular over Voice Over Internet Protocol (VOIP) networks.

In a VOIP network a VOIP gateway or edge-device converts packet data at an interface between a circuit switched network the VOIP network. The quality of the speech reconstructed by the edge-device from the packets it receives can be adversely affected by transmission degradation conditions such as variations in packet arrival time (jitter) and packet loss in the packet VOIP network. In general, the speech quality will reduce as jitter and/or packet loss increase.

The VOIP packet stream itself is well defined so VOIP calls can be identified either by monitoring call control signalling and extracting call set-up messages or by being able to recognise VOIP packets. A VOIP or packet based perceptual quality evaluation processor can be arranged to recognise VOIP packets as this enables calls to be identified even if the start of the call is missed. This technique also avoids problems when the packet stream and signalling information travel via different routes.

In order to monitor the speech quality of a VOIP from within the IP network, there is a need to account for the highly non-linear VOIP gateway.

A VOIP or packet based perceptual quality evaluation processor needs to account for each gateway according to the properties of the gateway because different gateway implementations respond to the effects of IP transmission in varying ways. Some areas of VOIP edge-device operation may be considered to be more interesting than others. These regions of interest are where small changes in transmission degradation conditions results in large changes in the perceived quality. Conversely if at a particular percentage packet loss the device consistently achieves low quality then the system quality is unlikely to improve with further packet loss and so testing for higher rates of packet loss is unnecessary.

As the performance profile of different edge-devices can vary significantly, it is highly advantageous to calibrate or configure the operation of a packet based perceptual quality evaluation processor so that it correctly takes the characteristics of the edge-device in the transmission link being assessed into account. However, calibrating a perceptual quality evaluation processor using an exhaustive set of pre-defined set of network conditions would either take too long or not provide detailed enough information in regions of interest. Similarly when testing the performance of a previously calibrated perceptual quality evaluation processor it is desirable to use a greater number of test sequences within regions of interest than outside regions of interest.

Although the primary application of the invention is the calibration and testing of a non-intrusive packet based perceptual quality evaluation processor, the very high levels of accuracy achievable by intrusive quality assessment systems make them ideal for performing the calibration and testing process.

A number of patents and applications relate to intrusive quality assessment, most particularly European Patent 0647375, granted on 14 Oct. 1998. In this invention two initially identical copies of a test signal are used. The first copy is transmitted over the communications system under test. The resulting signal, which may have been degraded, is compared with the reference copy to identify audible errors in the degraded signal. These audible errors are assessed to determine their perceptual significance—that is, errors that are considered significant by human listeners are given greater weight than those that are not considered so significant. In particular inaudible errors are perceptually irrelevant and need not be assessed.

The problem addressed by this invention is to produce a set of test sequences that exercise each edge-device over the main region of interest while keeping the testing time to a minimum.

2. Related Art

International patent Application No WO0197414 describes an apparatus in which the perceptibility of degradations caused to signals transmitted over a transmission medium is measured by generating one or more predetermined transmission degradation conditions and subjecting a test signal to the transmission degradation conditions in a network simulation device. The degree to which each transmission degradation condition is perceptible to the human perceptual system is measured and a data set is generated and stored for converting one or more transmission degradation conditions to respective values of perceptibility. The data set may be a look-up table or an empirically determined formula. The data set may then be used on live traffic, by identifying objectively measured transmission degradation conditions in the received signal and retrieving from the data set in the data storage means a value of perceptibility associated with the transmission degradation conditions so identified. In this way a measure of the subjective significance of degradation in the signal can be derived from objective measures of degradation. An initial plurality of degradation conditions may be imposed on the system, and further degradation conditions are then selected according to the degree of variation in the resulting perceptibility measurement values.

SUMMARY OF THE INVENTION

According to the invention there is provided a method of defining an optimised set of test sequences for use with a packet based perceptual quality evaluation processor associated with an edge-device that receives packets containing speech data and converts said packets to a speech signal, the method comprising the steps of: defining a set of quality targets which should be produced when a test sequence of packets is processed by the edge-device; determining a value for a degradation parameter for each quality target wherein a test sequence having a degradation according to said value will substantially produce said quality target when said test sequence is processed by the edge-device.

Other aspects of the invention are described in the following description and defined in the appended claims.

BRIEF DESCRIPTION OF THE DRAWINGS

An embodiment of the invention will now be described, by way of example only, with reference to the accompanying drawings, in which.

DETAILED DESCRIPTION

Figure 1:
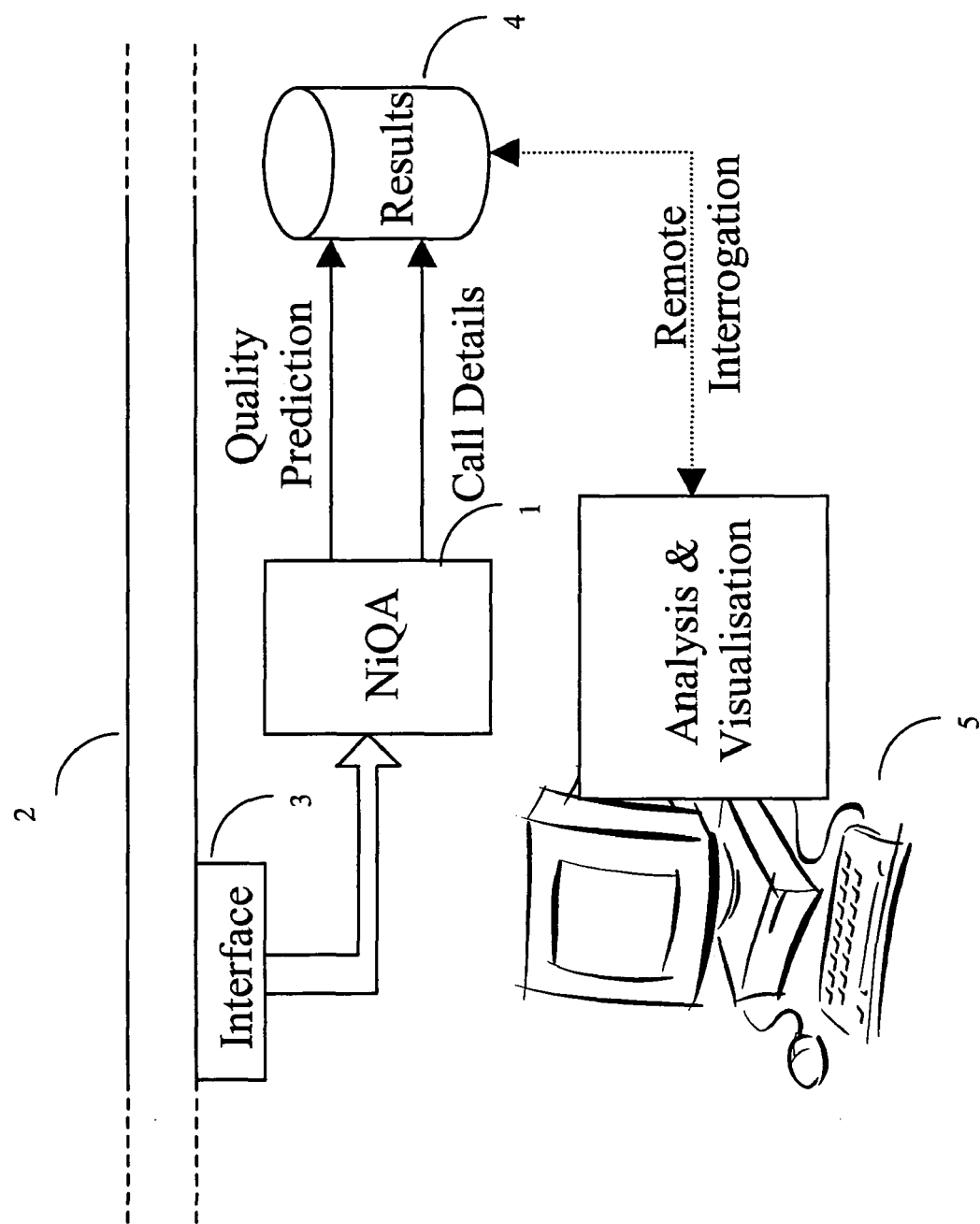
FIG. 1 is a schematic illustration of a non-intrusive quality assessment system.

Referring to FIG. 1, a non-intrusive quality assessment system 1 is connected to a communications channel 2 via an interface 3. The interface 3 provides any data conversion required between the monitored data and the quality assessment system 1. A data signal is analysed by the quality assessment system and the resulting quality prediction is stored in a database 4. Details relating to data signals which have been analysed are also stored for later reference. Further data signals are analysed and the quality prediction is updated so that over a period of time the quality predication relates to a plurality of analysed data signals.

The database 4 may store quality prediction results resulting from a plurality of different intercept points. The database 4 may be remotely interrogated by a user via a user terminal 5, which provides analysis and visualization of quality prediction results stored in the database 4.

Figure 2:
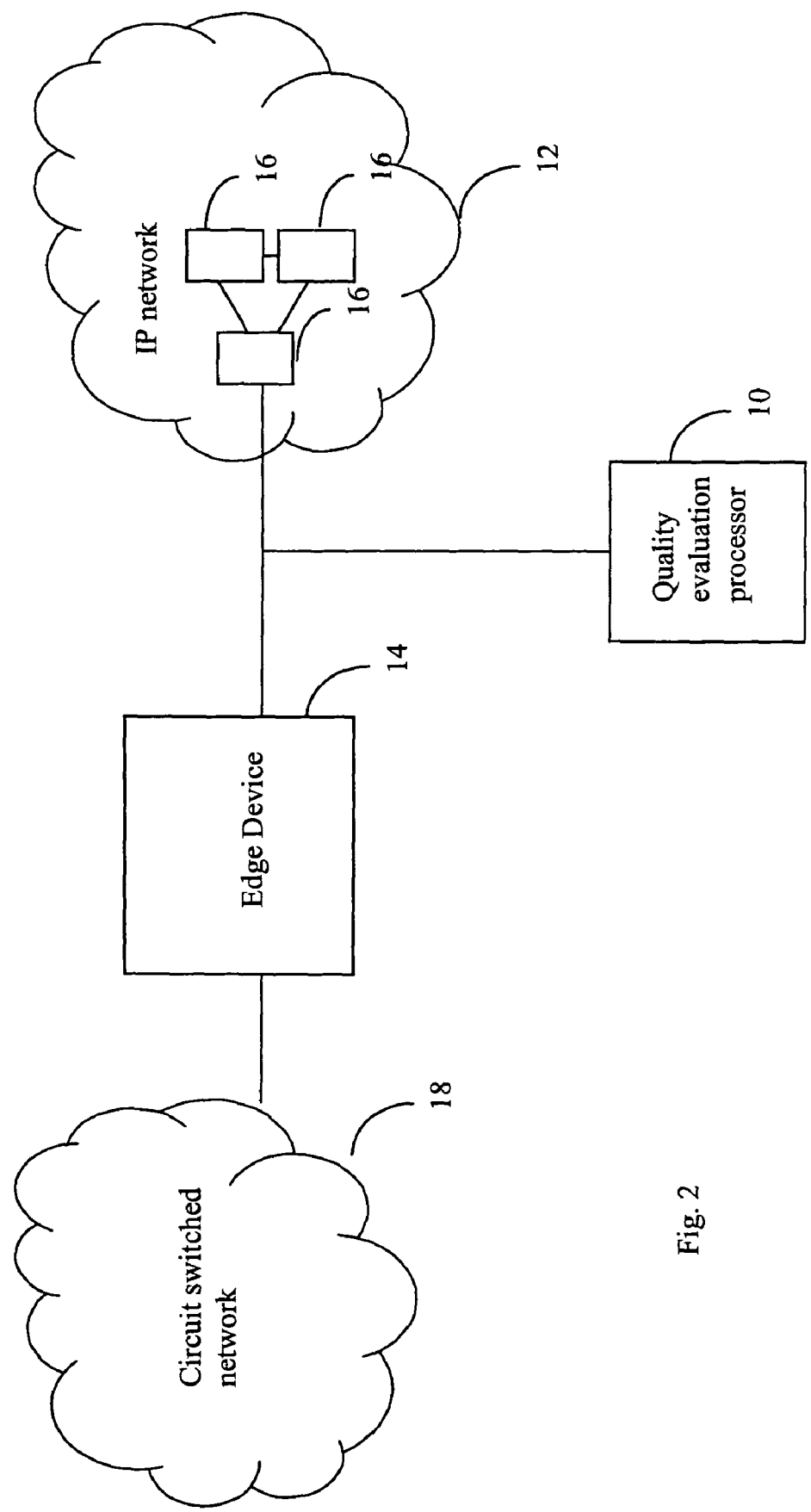
FIG. 2 is a block diagram illustrating a non-intrusive quality assessment system monitoring calls between an IP network and a circuit switched network.

Referring now to FIG. 2, an edge-device such as a VOIP gateway 14 converts data at an interface between a circuit switched network 18 and an IP network 12. The IP network 12 comprises a plurality of IP routers 16. A packet based perceptual quality evaluation processor 10 monitors VOIP calls to assess quality of speech provided by the IP network, specifically the quality of the speech passed to the circuit switched network 18 by the edge-device 14. Ideally, the evaluation processor will have previously been calibrated to work with the particular edge-device 14.

Figure 3:
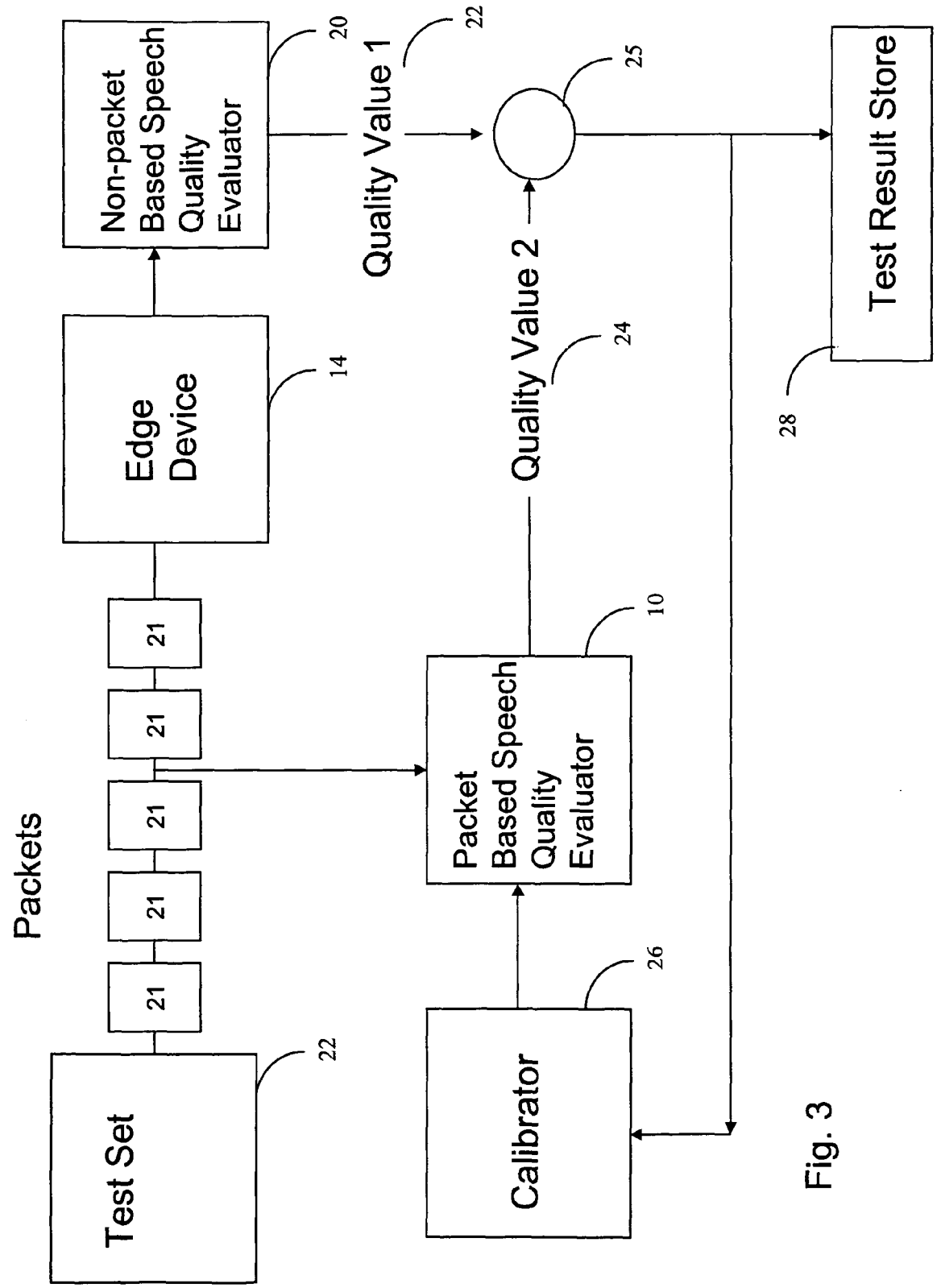
FIG. 3 is a block diagram illustrating calibration and test of a packet based perceptual quality evaluation processor.

FIG. 3 illustrates schematically on the same figure, calibration of a packet based perceptual quality evaluation processor and testing of said processor (although in practice these processes would take place independently from one another).

A test sequence comprising a sequence of packets 21 from a test set 22 are passed through the edge-device 14. The sequence is also evaluated by the packet based perceptual quality evaluation processor 10. After the packets have been processed by the edge-device 14 a non-packet based speech quality evaluator is used to generate a first quality value 22. The packet based perceptual quality evaluation processor 10 generates a second quality value 14. During calibration the two quality values are compared 25 and the result is used by a calibrator 26 to update the packet based perceptual quality evaluation processor 10. During testing the difference between the two quality values is stored in a store 28 for later analysis.

In both cases the process involves passing test sequences through the edge-device 14 and then measuring the perceptual quality using a non-packet based perceptual speech quality evaluator 20. The Perceptual Evaluation of Speech Quality (PESQ) algorithm described in ITU-T Recommendation P.862 and P.862.1 would make an ideal choice for the non-packet based perceptual speech quality evaluator. Test sequences must be played through the edge-device 14 in real-time (ie a three second test sequence will take three seconds to process). This means that the number of test sequences must be kept to a minimum in order to perform the test or calibration in practical timescales.

The region of interest when assessing the performance of a packet based perceptual speech quality evaluator with a particular edge-device is the region of operation where the speech quality degrades from its maximum value towards its minimum value for a particular degradation parameter.

In the method according to the present invention a search is carried out to generate test sequences such that there are more test sequences in the region of interest that there are outside the region of interest.

Figure 4:
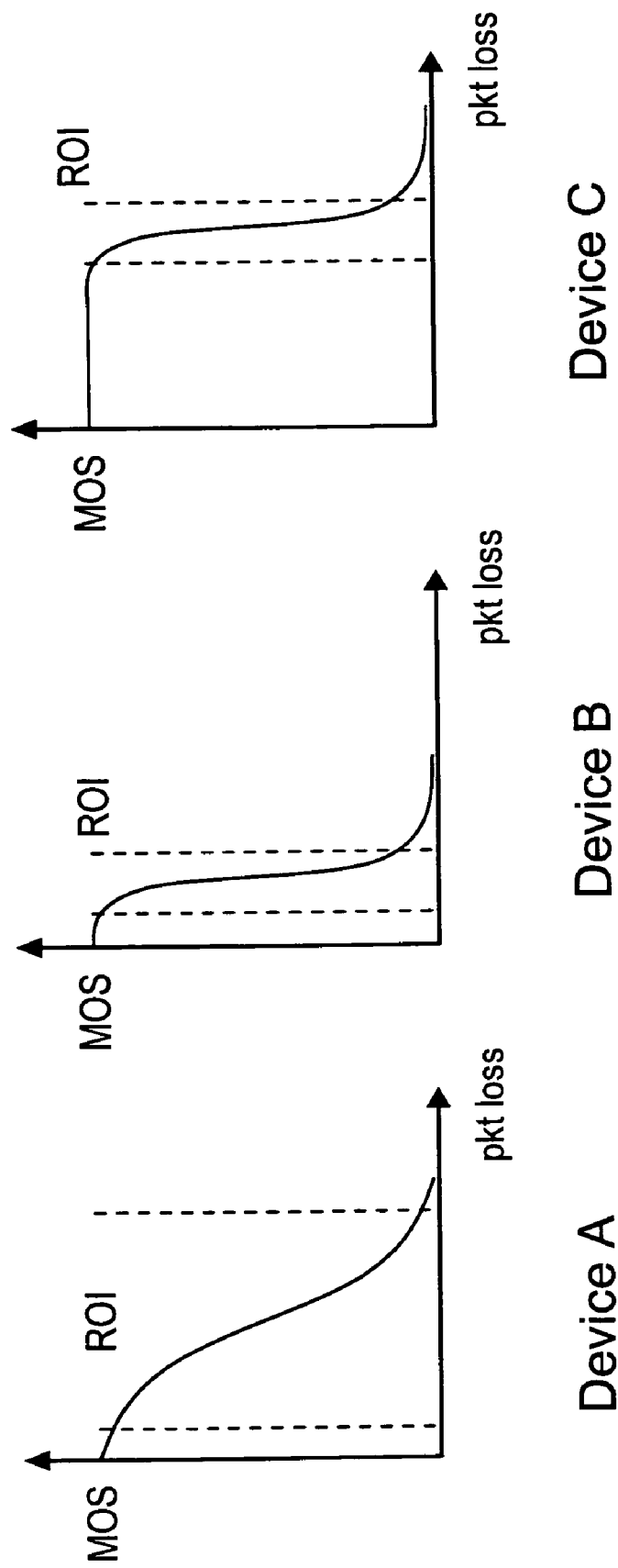
FIG. 4 is an illustration of different quality profiles for different VOIP gateways.

FIG. 4 show regions of interest (ROI) for three edge different devices as a function of the degradation parameter packet loss. It can be seen that the regions of interest for the three devices are quite different: Device A has a relatively wide region of interest; whereas Devices B and C have relatively narrow regions of interest, but in different parts of the packet-loss range.

Figure 5B:
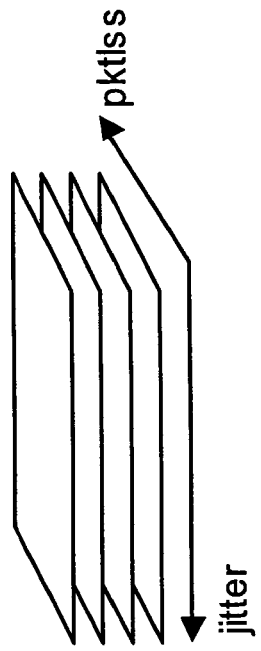
FIGS. 5a to 5c illustrate two dimensional parameter spaces.

We could consider degradation parameters independently from one another in a one dimensional parameter space. In general the two degradation parameters of most interest are packet loss and jitter. Therefore the degradation parameter space can be considered to be a two-dimensional space where the two axes represent increasing packet loss and increasing jitter (see FIG. 5a). However, in practice, packet loss and jitter profiles cannot be completely specified in terms of a single simple scalar value such as mean packet loss or mean jitter—we must also consider more detailed characteristics such as probability distributions and burstiness.

Figure 5C:
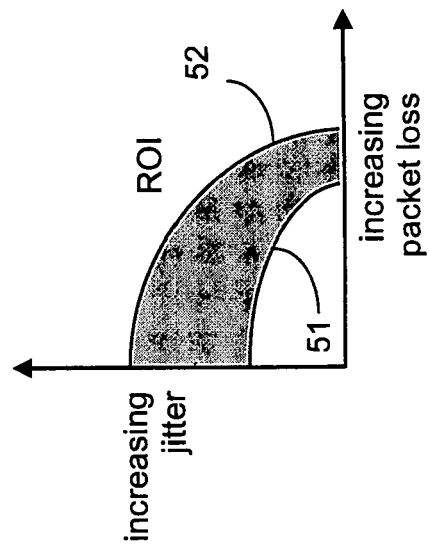
Figure 5A:
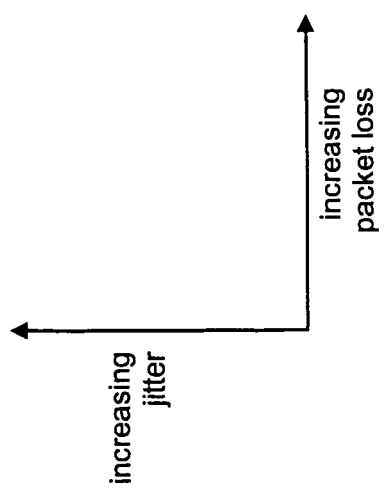

A practical way of handling this problem is to define a number of parameter spaces where each space corresponds to a particular jitter parameter and a particular packet loss parameter. Each particular parameter may be defined in terms of a distribution such that the degree of jitter or packet loss can be controlled by a single scalar variable. We then have a two-dimensional space that can be searched to find the region of interest for that combination of distributions. Hence a number of two dimensional spaces (illustrated schematically in FIG. 5b) can be searched for regions of interest in each space. FIG. 5c illustrates schematically a region of interest in a particular two dimensional space.

It would be possible for other two dimensional spaces to be defined in terms of other degradation parameters, or to generalize the search such that three or more dimensional spaces are searched for regions of interest.

The search is carried out by exercising an edge-device over a range of operating conditions by defining a set of degradation parameter spaces that include a number of different combinations of degradation parameter distributions. A simple example is a Normal distribution where the standard deviation is fixed and a scalar variable is used to control the mean value of the distribution. Thus as the scalar value is increased, the mean jitter (or packet loss) will increase causing the speech quality to decrease.

The goal of the invention is to define a set of test sequences that focus on the regions of interest while keeping the overall number of sequences to a minimum. Within each parameter space that has been defined the goal is to produce a set of test sequences that covers the region of interest for all edge-devices with sufficiently high resolution.

Figure 6B:
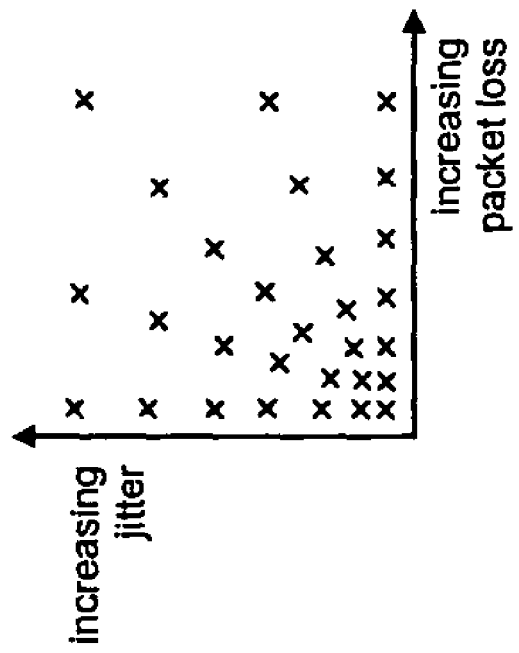
FIGS. 6a and 6b illustrate schematically potential methods of selecting test sequences for testing or calibrating a packet based perceptual quality evaluation processor.
Figure 6A:
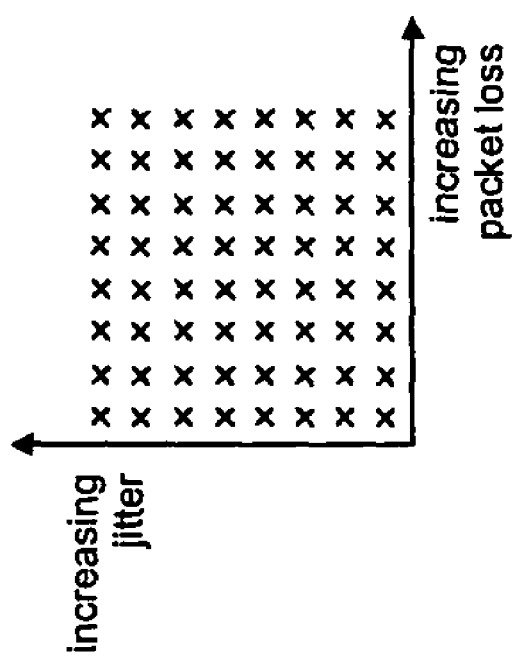

One solution would be to create, in each space, a set of predefined of test sequences large enough to cover the region of interest for all expected edge-devices (see FIG. 6a). However, in order to provide sufficient resolution within any given region of interest, the vector density would need to be very high. As a result, the time taken to process all of the test sequences would be impractical.

Another approach might be to use a non-uniform distribution of predefined test sequences to provide better resolution near the origin of the parameter space (see FIG. 6b); however, such an approach would result in poor resolution for an edge-device with characteristics such as those shown for Device C in FIG. 4.

In the method of this invention a set of quality targets is defined that the test sequences must produce. The edge-device 14 together with the non-packet based perceptual quality evaluator 20 is used to determine the values of particular degradation parameters required to produce each quality target. The region of interest for any given edge-device and degradation parameters is determined by searching the degradation parameter space for parameters which will produce test sequences which produce particular quality targets.

Figure 7B:
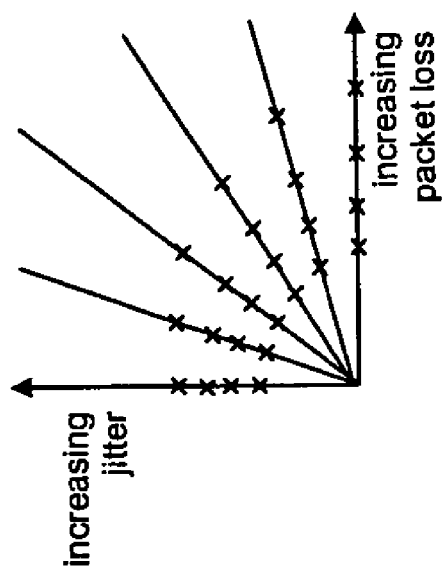
FIGS. 7a and 7b illustrate schematically a method of generating test sequences for testing or calibrating a packet based perceptual quality evaluation processor according to the present invention.
Figure 7A:
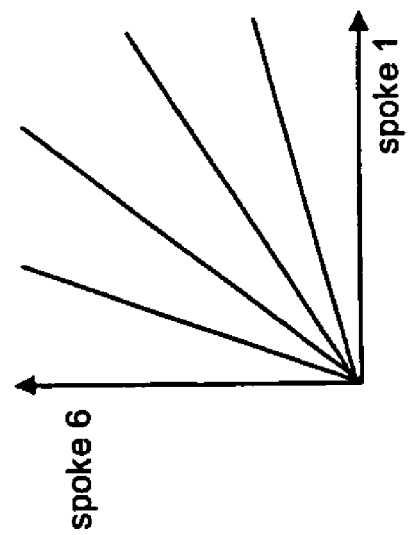

One advantage of using test sequences which produce such quality targets is that it will require the generation and processing of far fewer test sequences than the use of exhaustive sets of predefined test sequences and hence the time taken for both the calibration and the testing processes will be minimised. Within each degradation parameter space, it is desirable to exercise the edge-device with different relative values of degradation parameters. This can be achieved by defining quality targets along a number of "spokes" extending from the origin of the degradation parameter space. FIG. 7a shows a parameter space with six spokes (including the two axes); FIG. 7b shows a set of parameters which will produce test sequences matching 4 quality targets on each spoke. An alternative to defining spokes is to divide the parameter space into the areas between the spokes.

In order to span the parameter space evenly, it is desirable to normalize the axes relative to the region of interest before defining the spokes. This can be achieved by initially searching for quality targets along the two axes to establish boundaries for the region of interest.

In a preferred embodiment of the invention the degradation parameters used are jitter and packet loss.

The relationship between jitter, j, and packet loss, p, along the ith normalized spoke can be written as:

$$\frac{j}{p} = \frac{j_{min}}{p_{min}} \tan\left(\frac{(i-1)\pi}{2(S-1)}\right)$$

where S is the number of spokes, jmin is the jitter value producing the lowest quality target with no packet loss, and pmin is the packet loss value producing the lowest quality target with no jitter. Thus spoke 1 is the packet loss axis and spoke S is the jitter axis. The lowest quality target should be higher than a P.862.1 MOS of 1.0, for example 1.5, because a value of 1.0 represents severe distortion, which can be caused by any high level of jitter or packet loss.

Similarly, the area between the ith and ith+1 spoke can be defined as:

$$\frac{j_{min}}{p_{min}} \tan\left(\frac{(i-1)\pi}{2(S-1)}\right) \le \frac{j}{p} \le \frac{j_{min}}{p_{min}} \tan\left(\frac{i\pi}{2(S-1)}\right)$$

If we define a quality target set with T targets in each of S spokes it is only required to find T×S test sequences. Clearly, the need to search for vectors that meet specific quality goals will mean that more than T×S vectors must be processed, but the total number will still be much smaller than required using predefined test sequences. The number of iterations in the search can also be reduced by allowing a tolerance on the target values.

Another advantage of using quality targets is that the targets can be set that emphasise certain parts of the quality. For example if the upper half of the quality range is more interesting than the lower half, an example set of quality targets might be:

{0.1, 0.3, 0.5, 0.6, 0.7, 0.8, 0.85, 0.9, 0.95, 1.0} with a tolerance of +/−0.025

In the preferred embodiment these quality targets are normalized relative to the quality obtained under error-free conditions. This is preferable to specifying absolute quality targets because the maximum quality produced by any given edge-device will depend on factors such as the speech codec being used.

In the preferred embodiment, the non-packet based perceptual speech quality evaluator is the Perceptual Evaluation of Speech Quality (PESQ) algorithm described in ITU-T Recommendation P.862 and P.862. The reference speech for this intrusive model is the speech that is used to construct each test sequence.

Figure 8:
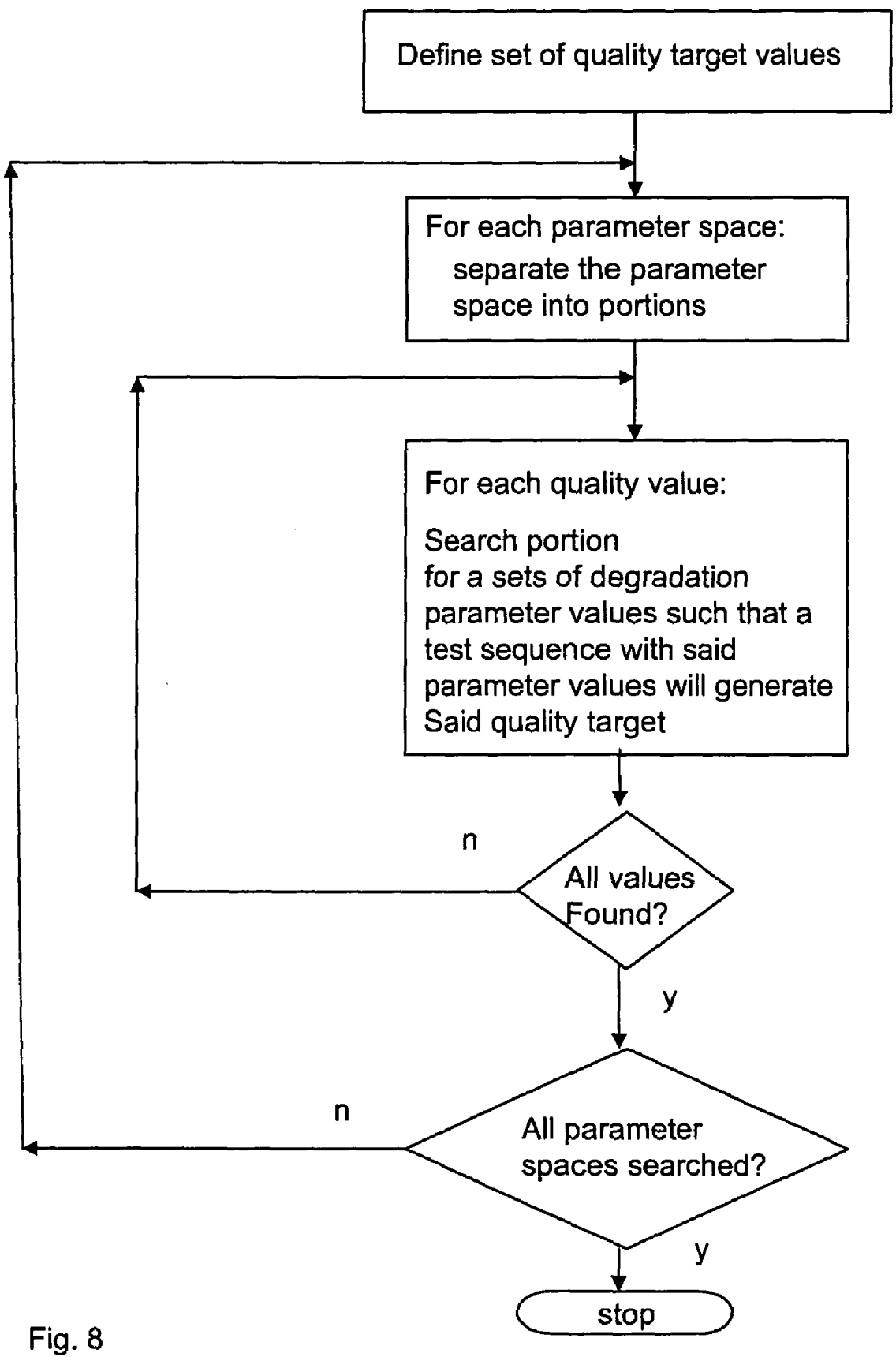
FIG. 8 is a flow chart illustrating the method of the present invention.

FIG. 8 is a flow chart illustrating the method steps of a preferred embodiment of the present invention. At step 80 a set of quality target is defined. In the preferred embodiment the quality targets are relative to a predetermined maximum and a predetermined minimum quality value.

For each parameter space the parameter space is searched as follows:

For each desired quality target at step 82 the parameter space is searched for a set of parameter values such that a test sequence with degradation according to those values will produce the desired quality target. The quality target could be that produced by the packet based perceptual quality evaluation processor 10. However in the preferred embodiment the quality target is that produced by the non-packet based perceptual quality evaluation processor 20, after the test sequence has been processed by the edge-device 14.

In the simplest case the parameter space could be a one dimensional space if only a single parameter is considered. However in the preferred embodiment a two dimensional space using jitter and packet loss parameters are used.

Within a particular parameter space (other than a one dimensional parameter space) a particular quality target may be met by several different combinations of the parameters. For example in the two dimensional parameter space shown in FIG. 5b contour 51 represents the plurality of sets of parameters which would produce a test sequence meeting one particular quality target and contour 52 represents the plurality of sets of parameters which would produce a test sequence meeting another particular quality target.

Therefore in the preferred embodiment the parameter space is separated into a number of portions and each portion is searched for a set of parameters which would produce a test sequence meeting a particular quality target.

Ideally each portion contains the same number of potential parameter sets as each other portion. In one embodiment, where the parameter space is two dimensional, the portions are defined as an area of the parameter space, and each area is the same size as each other area, such that each area contains the same number of potential parameter sets as each other area.

In the preferred embodiment the portion is defined as a vector, or spoke, in the parameter space. The vector is search using a geometric progression followed by a bisection search.

Figure 9C:
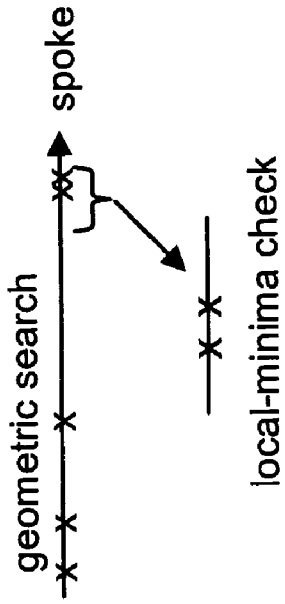
FIGS. 9a to 9d illustrate schematically a search along a vector for specific quality goals.
Figure 9D:
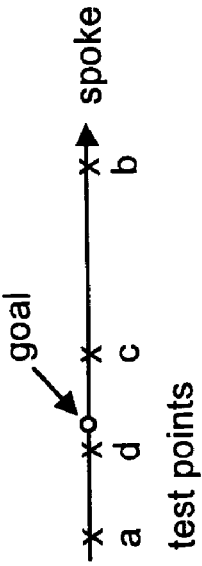
Figure 9A:
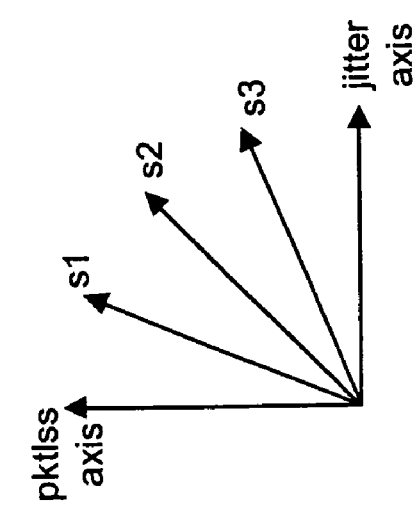
Figure 9B:
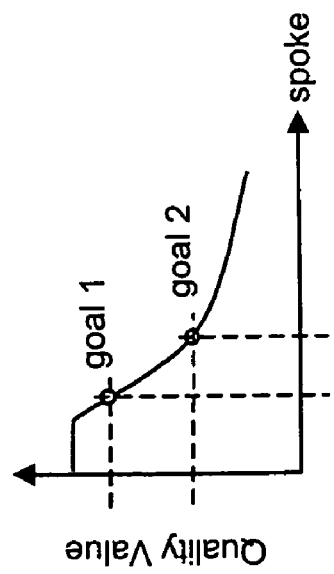

FIG. 9a illustrates vectors in a two dimensional jitter/packet loss parameter space. As degradation parameters are selected along a particular spoke, as the distance from the origin of the parameter space increases, the quality which will be produced by a test sequence having a those degradation parameter values decreases. A possible quality profile is illustrated in FIG. 9b.

For a particular quality target the spoke is searched in an initial geometric search phase (illustrated schematically in FIG. 9c) by selecting parameter values and determining the quality which would be produced by a test sequence having those degradation parameter values. If the quality is greater than the quality target (minus a predetermined tolerance) then the parameters values are increased by multiplying the degradation value by a predetermined amount, which should be greater than unity, and the process is repeated until the quality produced is less than the quality target (plus the predetermined tolerance). If the quality produced falls within the target plus or minus the tolerance then the quality target is deemed to have been met and the test sequence generated from the parameters is stored in the generated test set.

In a preferred embodiment, prior to moving on to the bisection search phase parameter values are increased slightly and the quality which would be produced by a test sequence having a those varied degradation parameter values is determined. This serves to check whether the parameter values fell into a local minimum rather than effectively having moved 'past' the goal.

If the parameters do not fall into a local minimum then the bisection search phase is commenced. In this phase the step size by which the parameter values are either increased or decreased is halved after each iteration. If the target is a higher quality than the quality produced by a test sequence with the present parameters then the degradation parameters are reduced, conversely if the target is a lower quality than the quality produced by a test sequence with the present parameters then the degradation parameters are increased. The bisection phase is continued until the quality produced is substantially equal to the target value (ie equal to the target value plus or minus the predetermined tolerance).

The bisection search phase is illustrated schematically in FIG. 9d. "a" and "b" show values chosen during the geometric search phase. Point "b" shows parameter values which had moved pass the goal, point "c" was selected next, which is half way between points "a" and "b". As point "c" is still past the goal then point "d" half way between point "a" and point "c" is selected next. This process is repeated until the target is substantially met. Due to the discrete nature of packet transmission, there may be cases where the bisection search is unable to produce a test sequence that achieves the quality goal within the desired tolerance. This situation can be addressed by limiting the total number of iterations in the bisection search and using the parameter values that resulted in the closest match to the quality target.

The test sequence generated from the parameters is stored in the generated test set. In an alternative embodiment the parameters themselves are stored and test sequences are regenerated from the stored parameters. Calibration and/or testing may be based on either the subset of parameters that met the quality goals or all of the parameters evaluated during the search phase.

It will be understood by those skilled in the art that the processes described above may be implemented on a conventional programmable computer, and that a computer program encoding instructions for controlling the programmable computer to perform the above methods may be provided on a computer readable medium.

It will also be understood that various alterations, modifications, and/or additions may be introduced into the specific embodiment described above without departing from the scope of the present invention.

The invention claimed is:

1. A method of generating an optimized set of test sequences for use with a packet based perceptual quality evaluation processor associated with an edge-device that receives packets containing speech data and converts said packets to a speech signal, the method comprising the steps of:
   (1)) defining a set of quality targets which should be produced when a test sequence of packets is processed by the edge-device:
      wherein a particular quality target is produced by use of a combination of a plurality of degradation parameters and
      determining a value for the degradation parameter, wherein a space defined by the plurality of degradation parameters is separated into portions and each set of values corresponding to a particular quality target is arranged to fall within a different portion from each other set and wherein each portion is defined as a vector in the degradation parameter space, wherein said step of determining a value for the degradation parameter includes the steps of:

determining a plurality of a set of values, each of said sets comprising a value for each degradation parameter; and a) choosing a value for each parameter of a set of parameters within said vector;

b) determining the quality produced by the edge-device for a test sequence having said chosen degradation parameter values;

c) determining the difference between the quality produced and the quality target;

d) in the event that the quality produced is greater than the quality target choosing new increased values for each parameter and setting a step size to be equal to the difference between the parameter values and the new increased values;

e) repeating sub-steps b)-d) until the quality produced is less than the quality target;

g) in the event that the difference between the quality produced and the quality target is greater than a tolerance i) choosing new values for each parameter in dependence upon the presently chosen values and said difference;
   ii) determining the quality produced by the edge-device for a test sequence having said chosen degradation parameter values;
   iii) determining the difference between the quality produced and the quality target; and
   vi) repeating sub-steps i)-iii) until the difference between the quality produced and the quality target is less than the tolerance; and h) setting the determined values to be equal to the chosen values;

wherein the new values chosen at sub-step f) are determined by: halving the step size;

in the event that the quality produced is greater than the quality target, increasing each parameter by the step size;

in the event that the quality produced is less than the quality target, decreasing each parameter by the step size;

(2) generating the optimized set of test sequences in dependence upon said set of quality targets determined at step (1) by determining a value for a degradation parameter for each said set of quality targets having the steps of determining a set of values, the set comprising a value for each degradation parameter, and exercising the edge device over a range of operating conditions;

wherein a test sequence having a degradation according to said value will produce said quality target when said test sequence is processed by the edge-device.

2. A method according to claim 1, wherein said quality targets are relative to a predetermined maximum quality and a predetermined minimum quality value.

3. A method according to claim 1, wherein the predetermined maximum quality value is determined by the quality value achieved by the edge-device with a test sequence having a degradation parameter of zero.

4. A method according to claim 1, in which each portion contains the same number of possible degradation parameters as each other portion.

5. A method according to claim 1, in which each vector in the degradation parameter space is equidistant from each other vector in the degradation parameter space.

6. A method according to claim 1, where the quality targets are spaced non-uniformly in order to emphasize a particular quality region.

7. A method according to claim 1 where the parameter is increased at step d) by multiplying the parameter by a factor equal to or greater than unity.

8. A method according to claim 1, in which the degradation parameter is jitter.

9. A method according to any claim 1, in which the degradation parameter is packet loss.

10. A method according to claim 1, where the method of determining the quality produced by the edge-device for a test sequence is an intrusive speech quality assessment algorithm.

11. A method according to claim 1, further comprising the step of storing the value of the degradation parameter for each quality target for later generation of said test sequence.

12. A method according to claim 1, further comprising the step of storing said test sequence.

13. A non-transitory computer readable medium carrying a computer program for implementing the method according to claim 1.

14. A method of calibrating a packet based perceptual quality evaluation processor comprising the steps of:

generating a test set according to the steps of:

a) defining a set of quality targets which should be produced when a test sequence of packets is processed by the edge-device; and b) generating said optimized set of test sequences in dependence upon said set of quality targets determined at step (a) by determining a value for a degradation parameter for each said set of quality targets wherein a test sequence having a degradation according to said value will produce said quality target when said test sequence is processed by the edge-device, and wherein the step of determining a value for a degradation parameter comprises exercising the edge device over a range of operating conditions;

generating a first opinion score using a test sequence from the test set and said packet based perceptual quality evaluation processor;

converting said test sequence to a speech signal using an edge-device;

generating a second opinion score from said speech signal and a non-packet based perceptual quality evaluation processor;

using the difference between said first opinion score and said second opinion score to update the packet based perceptual quality evaluation processor.

15. A method of testing a packet based perceptual quality evaluation processor comprising the steps of:

generating a test set according to the steps of:

a) defining a set of quality targets which should be produced when a test sequence of packets is processed by the edge-device; and b) generating said optimized set of test sequences in dependence upon said set of quality targets determined at step (a) by determining a value for a degradation parameter for each said set of quality targets wherein a test sequence having a degradation according to said value will produce said quality target when said test sequence is processed by the edge-device, and wherein the step of determining a value for a degradation parameter comprises exercising the edge device over a range of operating conditions;

repeating the steps of:
  generating a first opinion score using a test sequence from the test set and said packet based perceptual quality evaluation processor;
  converting said test sequence to a speech signal using an edge-device;
  generating a second opinion score from said speech signal and a non-packet based perceptual quality evaluation processor; and
  storing the difference between said first opinion score and said second opinion score until all test sequences in the test set have been considered; and
  generating a test score from said stored differences.

16. A method of generating an optimised set of test sequences for use with a packet based perceptual quality evaluation processor associated with a VoIP edge-device that receives packets containing speech data and converts said packets to a speech signal, the method comprising the steps of:

a) defining a set of target voice quality levels which should be produced when a test sequence of packets is processed by the VoIP edge-device by identifying a maximum voice quality achieved by the VoIP edge device under ideal IP impairment conditions and identifying a plurality of target voice quality levels between the maximum and a minimum quality value; and b) generating said optimized set of test sequences in dependence upon said set of target voice quality levels by identifying a set of test sequences having different IP impairment factors, and iteratively searching for a test sequence that produces a desired target voice quality level by exercising the VoIP edge device over a range of operating conditions, whereby the result of exercising the VoIP edge device at a first operating condition is used to modify the operating conditions used in exercising the VoIP edge device in a subsequent iteration of exercising the VoIP edge device.

* * * * *